Figure 3:
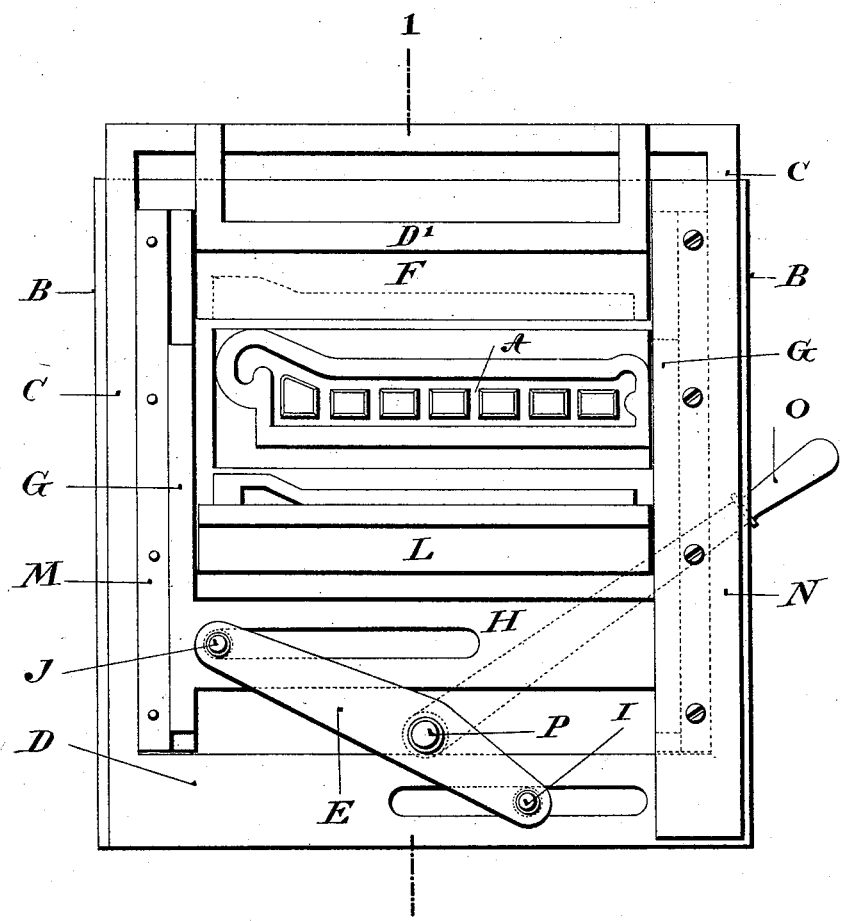

(No Model.) 2 Sheets—Sheet 1.
H. STURM.
APPARATUS FOR MOLDING CLAY, &c.
No. 591,302. Patented Oct. 5, 1897.
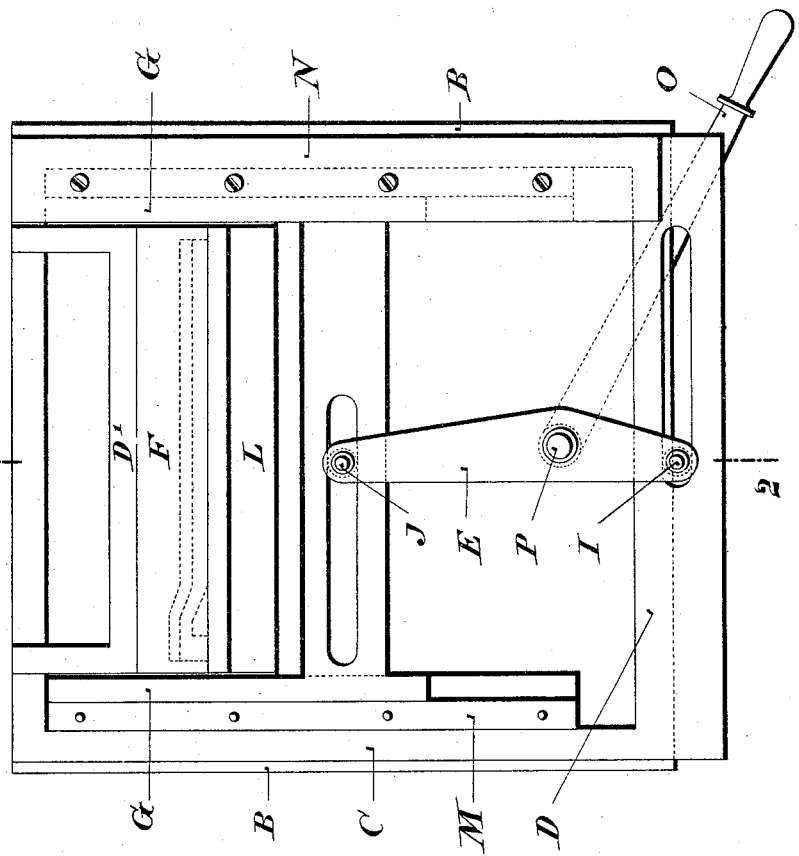
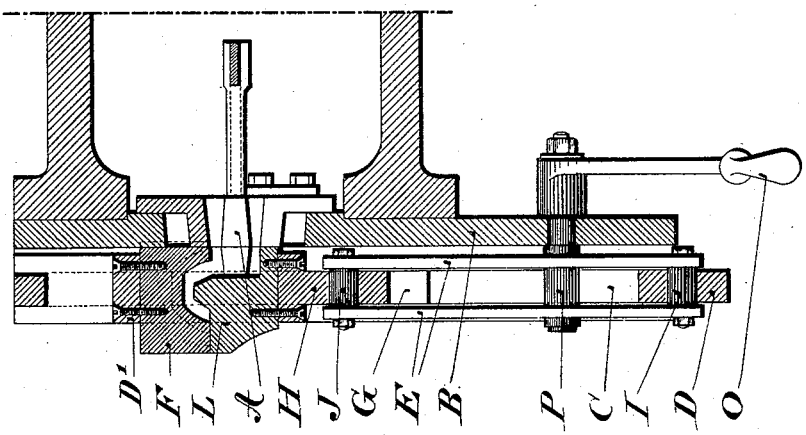
Witnesses
James L. Norris Jr.
Robert Emmett.
Inventor.
Henry Sturm.
By James L. Norris.
Atty.

(No Model.) 2 Sheets—Sheet 2.

H. STURM.
APPARATUS FOR MOLDING CLAY, &c.

No. 591,302. Patented Oct. 5, 1897.

Witnesses
James L. Norris Jr.
Robert Everett

Inventor.
Henry Sturm.
By James L. Norris
Atty.

UNITED STATES PATENT OFFICE.

HENRY STURM, OF PARIS, FRANCE.

APPARATUS FOR MOLDING CLAY, &c.

SPECIFICATION forming part of Letters Patent No. 591,302, dated October 5, 1897.

Application filed June 15, 1896. Serial No. 595,641. (No model.)

*To all whom it may concern:*

Be it known that I, HENRY STURM, manufacturer, a citizen of the French Republic, residing at Paris, in the Republic of France, have invented new and useful Improvements in Apparatus for Molding Clay, &c., of which the following is a specification.

My invention relates to an apparatus which is capable of being used in connection with any formative mouthpiece employed in the manufacture of ceramic articles, but is particularly intended for the manufacture of ceramic goods, such as roofing-tiles, having longitudinal and lateral prominences or recesses, or both.

My present invention relates to certain improvements in mechanism of this type whereby I obtain more rapid, uniform, and better results and am able to operate the jaws of the apparatus simultaneously with the exercise of less power than would be necessary but for my invention. In apparatus for this purpose, according to this invention, there are employed a pair of jaw-like parts, one male and the other female, capable of such operation as to impart to the clay the shape necessary for forming the required prominences or recesses.

Figure 1 is a vertical section taken on the line 1 2 in Fig. 2, showing the apparatus. Fig. 2 is a front elevation of the parts shown in Fig. 1. Fig. 3 is a front elevation of the same parts in a different position.

Referring to Figs. 1, 2, and 3 in the plane of a plate constituting a mouthpiece A, arranged in the ordinary manner, there is located a frame B, on which are mounted two movable frames, which I will now describe. One of these frames comprises two uprights C, formed integral with or connected to two horizontal parts D and D'. The part D has a groove in which a roller I, forming part of a movable lever E, is adapted to slide. The other and wider part D' serves to receive the upper jaw F, which may be fixed by any suitable means, and has in it a recess having the form of the transverse prominence to be produced. The other movable frame is similarly composed of two uprights G and a horizontal cross-piece H, in which there is formed a groove similar to that in the cross-piece D, and adapted likewise to receive a roller J, which is similar to the roller I and also forms part of the movable lever E. Upon the horizontal cross-piece H there is mounted and fixed by any suitable means the lower jaw L, which is intended to produce, by coöperating with the upper jaw, that part of the article which is to constitute the required transverse prominence.

The uprights C and G are capable of sliding on the fixed frame B in a suitable direction, for which purpose they are separated from each other by small rods M and held in place by means of covering-plates N, fixed on the small rods M.

The two jaws F and L are raised and lowered by means of a lever O, which is connected to the lever E and serves to displace the said lever angularly about its fixed axis of rotation P, and thereby, through the medium of the rollers I and J, to raise and lower the two movable frames, respectively, these frames moving simultaneously toward or away from each other into the position shown in Figs. 1, 2, and 3, respectively.

The mode of operation is obvious. In the first place, the two jaws are brought near to each other and as the clay is being forced out by pressure the part to constitute the transverse prominence is formed. The two jaws are then opened and the molding proceeds in the usual manner. The article is cut off by the means usually employed. The mechanism for operating these means may be connected with that for operating the frames, so that the two operations may be effected simultaneously.

Having now particularly described the nature of my invention, what I claim is—

In an apparatus for molding clay, the combination with a formative mouthpiece, of a supporting-frame, two frames movable toward and from each other on the said supporting-frame, two jaws supported by said movable frames to form prominences on the tile transverse to its length, a lever arranged between said movable frames upon a fulcrum between its ends, which are provided with rolls, grooves formed in said movable frames at right angles to the line of their movement, said grooves receiving the rolls upon the ends of the lever and means for operating said lever to draw the movable frames toward each other and into coöperative relations with said formative mouthpiece, then transversely in front of said mouthpiece to cause said jaws to form prominences on the tile transverse to its length, and finally away from each other, to uncover the mouthpiece and permit the completion of the tile, substantially as described.

In testimony whereof I have hereunto set my hand in presence of two subscribing witnesses.

HENRY STURM.

Witnesses:
CLYDE SHROPSHIRE,
MORTIMER STERLING.